Patented Jan. 8, 1935

1,986,816

UNITED STATES PATENT OFFICE 1,986,816

FLOTATION PROCESS

Torsten Hasselstrom, New York, N. Y.

No Drawing. Application December 3, 1931,
Serial No. 578,842. Renewed March 31, 1934

17 Claims. (Cl. 209—166)

The present invention relates to the use of a novel flotation agent for use in the concentration of oxidized ores containing alkaline earth metals.

It is an object of the present invention to employ a novel flotation agent which is capable of yielding improved recoveries in the flotation of oxidized ores of the alkaline earth group and which is capable of being utilized in a practical manner on an industrial scale with conventional flotation equipment.

It is another object of the invention to employ a flotation agent for the concentration of oxide alkaline earth ores.

It is also within the contemplation of the invention to employ a flotation agent of the character described which is cheaper than agents now known and available to the art and which is capable of being obtained in large quantities from the paper and pulp industry.

Other objects and advantages of the present invention will become apparent from the following description.

I have discovered that talloel obtained from black liquor of the sulfate process of paper and pulp making is very effective as a flotation agent for the concentration of oxidized ores of certain metals, to wit: alkaline earth metals, and is capable of yielding improved recoveries of the valuable minerals far in excess of those obtained with flotation agents heretofore known and employed.

Generally speaking, the present invention contemplates the utilization of talloel in a pulp of oxidized ores of alkaline earth metals which has a water phase having a fairly pronounced alkalinity for effecting the separation and recovery of the valuable mineral particles, termed the concentrates, from the waste gangue, termed the tailings.

According to the present discovery oxidized alkaline earth metal ores are subjected to the usual operations to produce a mass of ground ore. In the event wet grinding has been used, the water content is adjusted to such an amount that the solids represent between about 65% to about 75% of the total mass of pulp. If dry grinding has been employed, a sufficient amount of water is mixed with the ground ore to produce a pulp whose solid content is about 65% to about 75%.

The water phase of the pulp is rendered alkaline by the use of a reagent which has no detrimental effect on the flotation operation and which does not form a precipitate with the flotation agent. In practice it has been found that the pH value of the water phase is preferably about 7.5 to about 9.0. Of the various alkaline reagents, caustic soda is the most practical and economical. Of course, other equivalent alkaline reagents, such as sodium, potassium or ammonium carbonate, potassium or ammonium hydroxide, sulfides of sodium or potassium, or the like, may be employed.

The aforesaid mass of pulp is thereafter mixed with talloel in sufficient amounts to effect a separation of the mineral particles from the gangue. In practice the water is maintained at a temperature such that the talloel is in a liquid condition. Ordinarily, a temperature at or above about 15° C. may be used to give satisfactory results.

After thorough and complete mixing, it is preferred to effect flotation of the mineral by passing the treated pulp through a flotation cell, preferably provided with mechanical agitation and sub-aeration. The mineral particles are floated to the surface by the aid of the talloel and may be drawn off the top of the flotation cell as a frothy mass which contains the concentrates. The gangue settles to the bottom and is withdrawn as the tailings. Of course, the flotation and recovery of the mineral may be effected in a series of cells instead of one cell as those skilled in the art will readily understand. In this case, the pulp is first treated in one flotation cell to give a clean tailing but a contaminated concentrate. From the first cell, the contaminated concentrate is conducted to a second flotation cell where further quantities of gangue are separated from the valuable mineral in the form of tailings. This operation can be repeated as often as desired or until a concentrate of the desired purity is obtained.

For a better understanding of the present invention by those skilled in the art, the following specific and illustrative examples are given.

Example No. 1

A typical oxidized ore of an alkaline earth metal is calcium phosphate which occurs in nature in various minerals. The more important minerals are apatite, phosphate rock, phosphorite, etc. which occur in Florida, Tennessee, Russia, Finland, Sweden, Norway and French and Spanish Moroccos, and other places in the world. As those skilled in the art know, the crude ores may contain quartz, calcium carbonate, oxides of iron, alumina, clay, silicates, and the like, which are considered as impurities or contaminants.

In the case of pebble phosphate ore, such as found in Florida, the crude ore is usually screened to separate the coarse ore from mud balls, etc. The screened ore is washed and screened again to obtain high grade products and fine material, known as washer debris. The washer debris consists of particles whose sizes are approximately minus one millimeter. This debris constitutes the feed for the flotation process and is preferably deslimed before treatment by the flotation process.

The hard rock phosphate ores are first crushed and ground, preferably in the presence of water, to produce a finely pulverized mass. It is preferred to employ ground material which varies in size from about minus 20 or 30 mesh to about plus 200 or 300 mesh.

The ground ore is preferably de-slimed in the customary manner by the use of suitable apparatus, such as the well known Dorr bowl classifier, or the like. After the de-sliming operation, the water content of the de-slimed ore is preferably adjusted to give a pulp containing about 65% to about 75% of solids say about 70%. This pulp is treated with caustic soda to impart a pronounced alkalinity thereto. In practice it is desirable to control the pH value within a range from about 7.5 to about 9.0 and preferably from about 8.0 to about 8.5. Usually it is preferred to incorporate the caustic soda in the pulp in a mixer.

After the pulp has been rendered alkaline with caustic soda, it is preferred to add a mineral oil. Ordinarily, a petroleum oil, such as fuel oil or a twenty gravity crude oil or mixtures thereof may be employed as the mineral oil and incorporated in the pulp by the use of the mixer. Instead of petroleum oil, other appropriate or equivalent oils may be used, such as shale oil, derivatives or by-products of coal tar or wood tar, or the like, may be used. It should be noted that mineral oils containing unsaturated hydrocarbons are preferred and give better results.

Talloel is finally added to the mixed pulp, preferably in such quantity that oil floating on the surface of the mass is incorporated in the body of the pulp. Mixing is preferably continued until the talloel is thoroughly and completely embodied and distributed in the pulp. When substantially complete distribution of talloel is effected, the pulp is ready for flotation.

The treated pulp is conducted to a flotation cell which is preferably provided with mechanical agitation and sub-aeration. The valuable mineral, i. e. calcium phosphate, is floated to the surface of the cell and is collected as a concentrate whereas the gangue sinks to the bottom of the cell and is removed as a tailing. By de-watering and/or drying the concentrate, it is ready for use by itself or for use in the manufacture and production of super phosphate of lime.

Example No. 2

Phosphate ore of the kind found in Florida and in Tennessee was prepared in the manner indicated in Example No. 1 to give a feed which was de-slimed and having a size of minus 20 mesh. The ground ore was carried in a pulp which contained about 70% of solids. This pulp was rendered alkaline by the addition of caustic soda to an extent of about 0.5 pound of caustic soda per ton of dry feed. After mixing the caustic soda thoroughly in the pulp a petroleum fuel oil was added to the causticized pulp to the extent of about 1.5 pounds of fuel oil per ton of dry feed. Finally, talloel was incorporated in the pulp mass to an extent of about 1.25 pounds of talloel per ton of dry feed.

After the addition of caustic soda, fuel oil and talloel to the pulp, the entire mass was mixed thoroughly and completely to effect a substantially complete distribution of the constituents throughout the pulp mass. The treated pulp was then subjected to flotation in an appropriate flotation cell provided with mechanical agitation and sub-aeration. The concentrate or valuable mineral was taken off the top as a frothy mass, whereas the tailing containing the worthless gangue sunk to the bottom and was removed at that point.

The results obtained in this example are indicated in the following Table I. In this table, the abbreviation "B. P. L." designates bone or basic phosphate of lime as one skilled in the art readily understands.

Table I

| Material | Weight | B. P. L. | B. P. L. recovery |
|---|---|---|---|
| | Per cent | Per cent | Per cent |
| Feed | 100.0 | 20.79 | |
| Concentrates | 27.8 | 63.50 | 85.0 |
| Tailings | 72.2 | 4.32 | 15.0 |

Example No. 3

A de-slimed feed of phosphate ore having the size of minus 20 mesh was treated in accordance with the method set forth in Example No. 1. The proportions of reagents, however, were as follows:

```
                           Pounds per ton
                            of dry feed
Caustic soda ------------------ 0.5
Fuel oil ---------------------- 5.0
Talloel ----------------------- 1.25
```

The results obtained from this example are given in Table II.

Table II

| Material | Weight | B. P. L. | B. P. L. recovery |
|---|---|---|---|
| | Per cent | Per cent | Per cent |
| Feed | 100.0 | 21.17 | |
| Concentrates | 32.9 | 64.33 | 97.4 |
| Tailings | 67.1 | 0.83 | 2.6 |

Example No. 4

Phosphate ore which has been de-slimed and which has the size of minus 20 mesh was treated in accordance with the method set forth in Example No. 1. The proportions of the reagents used, however, were as follows:

```
                           Pounds per ton
                            of dry feed
Caustic soda ------------------ 0.50
Fuel oil ---------------------- 5.0
Talloel ----------------------- 1.0
```

The results obtained in this example are set forth in the folowing Table III:

Table III

| Material | Weight | B. P. L. | B. P. L. recovery |
|---|---|---|---|
| | Per cent | Per cent | Per cent |
| Feed | 100.0 | | |
| Concentrates | 26.8 | 70.3 | 93.8 |
| Tailings | 73.2 | 1.7 | 6.2 |

For the purpose of comparison and for the purpose of demonstrating the improvements over and above the art, a test was made in which a feed of de-slimed, minus 20 mesh of phosphate ore, was used. In place of the present flotation agent, however, the well known red oil or oleic acid was used. The proportions of the reagents used are as follows:

```
                           Pounds per ton
                            of dry feed
Caustic soda ------------------ 0.50
Fuel oil ---------------------- 5.0
Red oil ----------------------- 1.0
```

The results obtained in this test are indicated in the following Table IV.

Table IV

| Material | Weight | B. P. L. | B. P. L. recovery |
|---|---|---|---|
| | Per cent | Per cent | Per cent |
| Feed | 100.0 | | |
| Concentrates | 15.8 | 60.13 | 57.8 |
| Tailings | 84.2 | 9.48 | 42.2 |

By comparing the results obtained by the use of the present flotation agent and process as shown in Table II and Table III with the results obtained by the use of the well known red oil and the conventional process shown in Table IV, it will be clear that the present flotation agent and the process of utilizing the same provides results which are in excess of those obtainable by the use of red oil and the conventional process.

In the treatment of phosphate or other ore, the following proportions may be used:

Caustic soda about 0.2 to about 2.0 lbs. per ton of dry feed.

Mineral oil about 2.0 to about 10.0 lbs. per ton of dry feed.

Talloel about 0.3 to about 5.0 lbs. per ton of dry feed.

It will be noted that the proportions of the various reagents can be controlled within a wide range. As one skilled in the art understands, the proportions may be varied with different ores, sizes of feed, apparatus employed, character of water, and the like, and may be adjusted and controlled as is customary in the flotation art to meet particular conditions.

*Example No. 5*

As an example of a barium ore, baryte may be cited as being one amenable to the present process and flotation agent. A synthetic mixture simulating a natural baryte ore was made up with river sand and crude baryte. About 50% of river sand was used with about 50% of crude baryte ore. The synthetic mixture was ground and treated in accordance with the method set forth in Example No. 1. The proportions of the reagents used are as follows:

```
                           Pounds per ton
                             of dry feed
Caustic soda_____ 0.6
Mineral oil_____ 5.0
Talloel_____ 4.0
```

The results of this example are indicated in the following Table V.

Table V

| Material | Weight | BaSO$_4$ | BaSO$_4$ recovery |
|---|---|---|---|
| | Per cent | Per cent | Per cent |
| Feed | 100.0 | 43.10 | |
| Concentrates | 36.4 | 72.13 | 60.9 |
| Tailings | 63.6 | 26.49 | 39.1 |

For the purpose of comparison and for the purpose of demonstrating the improvements over and above the art, a test was made with the aforesaid synthetic mixture of baryte ore, was used. In place of the present flotation agent, however, the well known red oil or oleic acid was used. The proportions of the reagents used are as follows:

```
                           Pounds per ton
                             of dry feed
Caustic soda_____ 0.60
Fuel oil_____ 5.0
Red oil_____ 4.0
```

The results obtained in this test are indicated in Table VI.

Table VI

| Material | Weight | BaSO$_4$ | BaSO$_4$ recovery |
|---|---|---|---|
| | Per cent | Per cent | Per cent |
| Feed | 100.0 | 36.33 | |
| Concentrates | 27.2 | 77.33 | 57.9 |
| Tailings | 72.8 | 21.0 | 42.1 |

*Example No. 6*

As an example of a strontium ore, strontianite may be cited as being one amenable to the present process and flotation agent. A synthetic mixture simulating a natural strontium ore was made up with river sand and crude strontianite. About 50% of river sand was used with about 50% of crude strontium ore. The synthetic mixture was ground and treated in accordance with the method set forth in Example No. 1. The proportions of reagents used are as follows:

```
                           Pounds per ton
                             of dry feed
Caustic soda_____ 0.6
Mineral oil_____ 5.0
Talloel_____ 4.0
```

The results of this example are indicated in Table VII.

Table VII

| Material | Weight | SrCO$_3$ | SrCO$_3$ recovery |
|---|---|---|---|
| | Per cent | Per cent | Per cent |
| Feed | 100.0 | 36.55 | |
| Concentrates | 36.9 | 81.26 | 82.1 |
| Tailings | 63.1 | 10.35 | 17.9 |

For the purpose of comparison and for the purpose of demonstrating the improvements over and above the art, a test was made with the aforesaid synthetic mixture of strontianite ore. In place of the present flotation agent, however, the well known red oil or oleic acid was used. The proportions of the reagents used are as follows:

```
                           Pounds per ton
                             of dry feed
Caustic soda_____ 0.60
Fuel oil_____ 5.0
Red oil_____ 4.0
```

The results obtained in this test are indicated in the Table VIII.

Table VIII

| Material | Weight | SrCO$_3$ | SrCO$_3$ recovery |
|---|---|---|---|
| | Per cent | Per cent | Per cent |
| Feed | 100.0 | 42.77 | |
| Concentrates | 41.1 | 81.82 | 78.6 |
| Tailings | 58.9 | 15.56 | 21.4 |

It will be observed that the present invention provides a flotation agent and a process of utilizing such agent whereby oxidized ores of the alkaline earth metals can be concentrated and alkaline earth minerals can be recovered from impurities and contaminants satisfactorily, efficiently and economically.

It will also be noted that the oxidized ores of alkaline earth metals include such ores as calcium ores like apatite, phosphorite, Florida pebble phosphate, Tennessee and Florida phosphate rock, scheelite, etc.; barium ores like baryte, witherite, etc.; and strontium ores like strontianite, celestite, etc. Of course, ores such as gypsum, etc., which are found in nature in a highly concentrated condition or in a high state of purity, do not have to be treated because they can be mined, milled and refined without resorting to flotation.

In the present specification and claims, talloel obtained from black liquor of the sulfate process is referred to as the improved flotation agent for oxidized ores of the alkaline earth metals of the character specified herein. It is to be noted that the black liquor of the sulfate process of paper or pulp making is not to be confused with liquor obtained from the sulfite process of paper or pulp making or other processes because the liquor obtained from these other processes will not yield talloel which is capable of functioning as a flotation agent for the ores mentioned herein.

In carrying the present invention into practice it is preferable to use talloel which has been refined. In essence, it is preferred to use a talloel which is substantially devoid of ligneous matter, of high saturated fatty acids of sulfate black liquor and which contains reduced amounts of oxidized colophonic acids and of non-saponifiable matter. A refined talloel of this sort has an acid number of about 190 to about 200, an iodine number of about 200 to about 210 according to the Hanus method and a specific gravity of more than 0.89 to less than 1.00 at about 20° C. When crude talloel is left standing for about 2 days to about 10 days at atmospheric temperatures or at refrigerated temperatures, the aforesaid constituents separate from the talloel and the foregoing refined talloel may be obtained.

It is to be noted that the foregoing composition which is employed in the present flotation process is not claimed herein but is disclosed and claimed together with the method of refining in my co-pending application Serial No. 578,841, filed December 3rd, 1931.

Although the present invention has been herein described in connection with certain specific proportions, temperatures, concentrations, and the like, it is to be observed that variations may be resorted to as one skilled in the art will readily understand.

I claim:—

1. The process of concentrating an oxidized ore of an alkaline earth metal which comprises forming a watery pulp of such ores, making said water pulp alkaline with a pH value of about 7.5 to about 9.0, agitating sulfate black liquor talloel with the aforesaid pulp to form a frothy mass of said oxidized ore and collecting said frothy mass.

2. The process of concentrating an oxidized ore of an alkaline metal which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, agitating sulfate black liquor talloel with said pulp to form a frothy mass of said oxidized ore and collecting said frothy mass.

3. The process of concentrating an oxidized ore of an alkaline metal which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, incorporating mineral oil in said pulp, agitating sulfate black liquor talloel with said pulp to form a frothy mass of said oxidized ore and collecting said frothy mass.

4. The process of concentrating an oxidized ore of an alkaline metal which comprises grinding such ore to provide ground material which varies in size from about minus 30 mesh to about plus 300 mesh, forming a watery pulp containing about 65% to about 75% of solids, adding caustic soda to said watery pulp to make the same alkaline with a pH value of about 8.0 to about 8.5, incorporating a petroleum oil in said pulp, agitating sulfate black liquor talloel with said pulp to form a frothy mass of said oxidized ore and collecting said frothy mass.

5. The process of concentrating an oxidized ore of an alkaline metal which comprises grinding such ore to provide ground material which varies in size from about minus 30 mesh to about plus 300 mesh, forming a watery pulp containing about 65% to about 75% of solids, adding caustic soda to said watery pulp to an extent of about 0.2 to about 2.0 pounds per ton of dry feed to make the same alkaline with a pH value of about 8.0 to about 8.5, incorporating a petroleum oil in said pulp to an extent of about 2.0 to about 10.0 pounds per ton of dry feed, agitating sulfate black liquor talloel to an extent of about 0.3 to about 5.0 pounds per ton of dry feed with said pulp to form a frothy mass of said oxidized ore and collecting said frothy mass.

6. The process of concentrating an oxidized ore of calcium which comprises forming a watery pulp of such ore, making said water pulp alkaline with a pH value of about 7.5 to about 9.0, agitating sulfate black liquor talloel with the aforesaid pulp to form a frothy mass of said oxidized ore and collecting said frothy mass.

7. The process of concentrating an oxidized ore of calcium which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, agitating sulfate black liquor talloel with said pulp to form a frothy mass of said oxidized ore and collecting said frothy mass.

8. The process of concentrating an oxidized ore of calcium which comprises grinding such ore to provide ground material which varies in size from about minus 30 mesh to about plus 300 mesh, forming a watery pulp containing about 65% to about 75% of solids, adding caustic soda to said watery pulp to an extent of about 0.2 to about 2.0 pounds per ton of dry feed to make the same alkaline with a pH value of about 8.0 to about 8.5, incorporating a petroleum oil in said pulp to an extent of about 2.0 to about 10.0 pounds per ton of dry feed, agitating sulfate black liquor talloel to an extent of about 0.3 to about 5.0 pounds per ton of dry feed with said pulp to form a frothy mass of said oxidized ore and collecting said frothy mass.

9. The proces of concentrating an oxidized ore of strontium which comprises forming a watery pulp of such ore, making said water pulp alkaline with a pH value of about 7.5 to about 9.0, agitating sulfate black liquor talloel with the aforesaid pulp to form a frothy mass of said oxidized ore and collecting said frothy mass.

10. The process of concentrating an oxidized ore of strontium which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, agitating sulfate black liquor talloel with said pulp to form a frothy mass of said oxidized ore and collecting said frothy mass.

11. The process of concentrating an oxidized ore of strontium which comprises grinding such ore to provide ground material which varies in size from about minus 30 mesh to about plus 300 mesh, forming a watery pulp containing about 65% to about 75% of solids, adding caustic soda to said watery pulp to an extent of about 0.2 to about 2.0 pounds per ton of dry feed to make the same alkaline with a pH value of about 8.0 to about 8.5, incorporating a petroleum oil in said pulp to an extent of about 2.0 to about 10.0 pounds per ton of dry feed, agitating sulfate black liquor talloel to an extent of about 0.3 to about 5.0 pounds per ton of dry feed with said pulp to form a frothy mass of said oxidized ore and collecting said frothy mass.

12. The process of concentrating an oxidized ore of barium which comprises forming a watery pulp of such ore, making said water pulp alkaline with a pH value of about 7.5 to about 9.0, agitating sulfate black liquor talloel with the aforesaid pulp to form a frothy mass of said oxidized ore and collecting said frothy mass.

13. The process of concentrating an oxidized ore of barium which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, agitating sulfate black liquor talloel with said pulp to form a frothy mass of said oxidized ore and collecting said frothy mass.

14. The process of concentrating an oxidized ore of barium which comprises grinding such ore to provide ground material which varies in size from about minus 30 mesh to about plus 300 mesh, forming a watery pulp containing about 65% to about 75% of solids, adding caustic soda to said watery pulp to an extent of about 0.2 to about 2.0 pounds per ton of dry feed to make the same alkaline with a pH value of about 8.0 to about 8.5, incorporating a petroleum oil in said pulp to an extent of about 2.0 to about 10.0 pounds per ton of dry feed, agitating sulfate black liquor talloel to an extent of about 0.3 to about 5.0 pounds per ton of dry feed with said pulp to form a frothy mass of said oxidized ore and collecting said frothy mass.

15. The process of concentrating an oxidized ore which comprises forming a watery pulp of such ore, making said water pulp alkaline with a pH value of about 7.5 to about 9.0, agitating sulfate black liquor talloel with the aforesaid pulp to form a frothy mass of said oxidized ore and collecting said frothy mass.

16. The process of concentrating an oxidized ore which comprises grinding such ore to provide ground material which varies in size from about minus 30 mesh to about plus 300 mesh, forming a watery pulp containing about 65% to about 75% of solids, making said watery pulp alkaline with a pH value of about 7.5 to about 9.0, agitating sulfate black liquor talloel with said pulp to form a frothy mass of said oxidized ore and collecting said frothy mass.

17. The process of concentrating an oxidized ore which comprises grinding such ore to provide ground material which varies in size from about minus 30 mesh to about plus 300 mesh, forming a watery pulp containing about 65% to about 75% of solids, adding caustic soda to said watery pulp to an extent of about 0.2 to about 2.0 pounds per tone of dry feed to make the same alkaline with a pH value of about 8.0 to about 8.5, incorporating a petroleum oil in said pulp to an extent of about 2.0 to about 10.0 pounds per ton of dry feed, agitating sulfate black liquor talloel to an extent of about 0.3 to about 5.0 pounds per ton of dry feed with said pulp to form a frothy mass of said oxidized ore and collecting said frothy mass.

TORSTEN HASSELSTROM.